United States Patent Office 3,579,715
Patented May 25, 1971

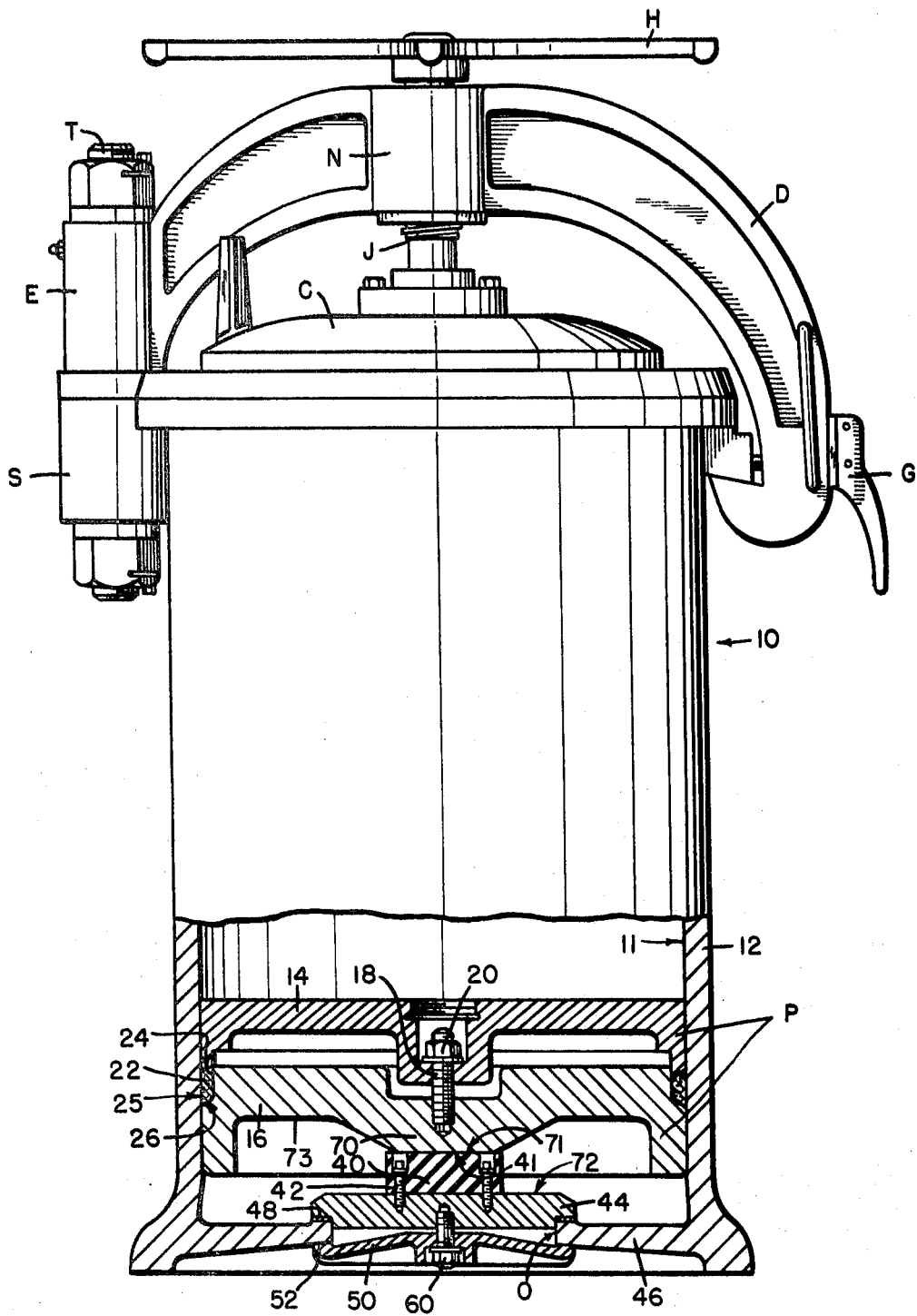

3,579,715
STUFFER WITH A RESILIENT CUSHIONING MEANS FOR PISTON
Carl Oscar Schmidt, Jr., Cincinnati, Ohio, assignor to The Cincinnati Butchers' Supply Company, Cincinnati, Ohio
Filed May 2, 1969, Ser. No. 821,287
Int. Cl. A22c 11/06
U.S. Cl. 17—39            9 Claims

ABSTRACT OF THE DISCLOSURE

Resilient cushioning means are interposed between the adjacent faces of the piston and the manhole cover in the bottom of a conventional sausage stuffer to prevent damage to the cover from impact of the piston thereon.

---

Conventional sausage stuffers have been used, for many years, in the meat industry for extruding a meat emulsion through a stuffing horn located at and projecting from the upper end of a stuffer housing, incident to movement of a piston from the lower end to the upper portion of the housing by means of fluid pressure introduced beneath the piston.

At the end of a stuffing cycle the piston will drop, of its own weight, to the bottom of the housing when the fluid pressure beneath the piston is released.

Conventional sausage stuffers have been found useful for extruding substances other than meat emulsions from the stuffing horn of a stuffer, one such substance being cheese products and the like which are "sticky" in nature as compared to meat emulsions.

Although conventional sausage stuffers are ideally suited for extruding sticky substances such as, by way of example, cheese products, through the stuffing horn incident to movement of a piston from the lower to the upper end of the housing by means of pressure media introduced below the piston, it has been found that in many instances the piston will be retained at the upper end of the housing at the conclusion of an extrusion cycle when, and even though the pressure media beneath the piston is released. It has been determined that the reason why the piston will not return, by gravity to the bottom of the stuffer at the end of an extrusion cycle, as when a meat emulsion is being extruded, is that the adhesive characteristics of the cheese substances increase the coefficient of friction between the piston and the inner wall of the stuffer housing within which the piston slides, to such a degree that the piston is literally "stuck" in its elevated position within the housing.

In an attempt to aid the return of a "stuck" piston to its starting position at the bottom of the housing after completion of an extrusion cycle of a substance having sticky, adhesive characteristics, such as cheese, for example, a vacuum is created beneath the piston in an effort to dislodge the piston from its fully raised position and return same to its starting position. However, the application of a vacuum does not result in instantaneous and/or controllable lowering of the piston, but to the contrary, in almost all instances, the piston will remain in its elevated "stuck" position for an appreciable period of time until the adhesive-induced friction between the piston and inner walls of the housing are overcome at which time the piston will suddenly break loose and literally shoot to the lower end of the housing with ever increasing accelration.

The impact of the high speed lowering of the piston on the manhole cover in the bottom of the stuffer housing results in serious damage to, and often destruction of the manhole cover which renders the stuffer unsuitable for its intended use.

The present invention is directed to the provision of a resilient cushion means in the form of a resilient bumper which is interposed between the adjacent faces of the piston and the manhole cover in such a manner as to absorb and dissipate the impact of a piston which is suddenly released from an elevated "stuck" position.

The drawing represents a conventional sausage stuffer, partly in section, utilizing the cushioning means of the present invention.

With particular reference now to the drawing, the numeral 10 denotes a conventional sausage stuffer which includes a cylindrical housing 12 in which a two-piece floating piston P is slidably mounted.

Piston P comprises an upper piston portion 14 and a lower piston portion 16 which are adjustably interconnected by means of a stud 18 and nut 20. A rubber packing 22 is located between inclined surface 24 of upper piston 14 and inclined surface 26 of the lower piston 16 whereby the degree of friction between outer surface 25 of packing 22 and inner wall 11 of cylindrical housing 12 may be varied by controlling the relationship between the upper and lower piston portions 14 and 16 respectively. It will be noted that if packing 22 is too tight the piston will not qualify as a "floating piston," that is it will not fall of its own weight when the air pressure beneath it is removed, in those instances in which a meat emulsion is being extruded. If the packing is too loose the air which is introduced beneath the piston to elevate same during a stuffing operation will seep into the product being extruded from the stuffer.

The degree of compression to which packing 22 is subjected is such as to prevent the seepage of air upwardly past the piston into the product being extruded—while enabling the piston to fall freely of its own weight within the housing whenever the air pressure beneath it is removed, when a meat emulsion is being extruded.

The subject invention is directed to the provision of a resilient bumper or cushioning member 40 which is interposed between the adjacent surface 71 of piston P and the surface 72 of the manhole cover 44 which closes the bottom opening O of bottom wall 46 of the stuffer housign.

A suitable gasket 48 is provided between the manhole cover 44 and opening O, as illustrated.

The numeral 50 denotes a manhole clamp having a peripheral portion 52 dimensioned to engage the undersurface of bottom wall 46 of the stuffer adjacent opening O for tightening manhole cover 44 against gasket 48 incident to tightening of bolt 60.

With particular reference now to lower portion 16 of the piston, it will be noted that it includes a central portion 70 which projects downwardly from portion 73, whereby to provide an abutting surface 71 dimensioned to engage upper surface 41 of resilient member 40 whenever the piston has been lowered to the bottom of the housing.

As illustrated in the drawing resilient member 40 may be secured by means of bolts 42 to the upper surface 72 of the steel manhole cover 44; however, if desired, resilient member 40 may be alternatively secured by means of bolts, or the like to surface 71 depending portion 70 of the lower piston 16.

The numerals 71 and 72 designate flat, parallel axial, adjacent surfaces of the piston and manhole cover respectively, said surfaces being of unequal area.

A stuffer which has been provided with a resilient cushioning member as 40 may be successfully and interchangeably used for stuffing conventional meat emulsions and/or for stuffing sticky substances such as, by way of example, cheese products, it being understood that whenever sticky products are being extruded a vacuum is applied to the area between the undersurface of lower piston 16 and the chamber whose bottom end is defined by manhole cover 44 to dislodge the piston from its fully elevated "stuck" position. The impact of the piston on the manhole cover 44 will be absorbed and dissipated by the resilient member 40 in such a manner as to preclude damage to any of the operating parts of the stuffer.

Uniformly satisfactory results have been obtained in those instances wherein the resilient cushion member 40 is fabricated from a medium hardness rubber, or the like, and is about two inches thick and has a diameter of from 5 to 6 inches. The surface area of the resilient member is in excess of the area of the smaller of surface areas 71 and 72.

With particular reference to the drawing, it will be noted that the upper ends of bolts 42 are disposed an appreciable distance below the upper axial surface of resilient member 40 whereby to insure that impact of the piston will be transmitted to manhole cover 44 entirely through said resilient material, and not through said bolts.

It should be understood that the upper end of the housing is provided with a stuffing horn, not illustrated, and that the upper, open top of the housing is adapted to be securely closed by a cover C which may be releasably locked in cylinder-closing relationship by means of yoke D pivotally mounted as at E relative to boss S of cylinder 12 for swinging movement about stud T whenever handle G has been released. The letter H denotes a conventional hand wheel which may be rotated for applying axial pressure to cover C by means of nut N and screw J.

It should be understood that suitable means, not illustrated, are provided for selectively introducing pressure media or a vacuum into the lower end of the housing between the space between the adjacent surfaces of the manhole cover and the lower portion of the piston when piston P is in fully lowered position.

Excellent results have been obtained in which the resilient member 40 is fabricated from medium-hardness rubber of a durometer range between 40 and 70, or of any other resilient cushioning means fabricated from a substance having the resilience and cushioning characteristics of rubber having a hardness in the durometer range of 40 to 70.

What is claimed is:

1. In a sausage stuffer of the type which includes a vertically disposed cylindrical housing having a manhole cover spanning and closing its lower end and having a piston movable therein from adjacent the lower end of the housing to adjacent the upper end of the housing by air pressure, the piston being returnable to its position adjacent the lower end of the housing by producing a vacuum beneath the lower surface of the piston in combination with gravity, and wherein said piston and manhole cover each have a flat, parallel, axial, adjacent surface, the improvement comprising:
resilient cushioning means interposed between the ad- adjacent axial surfaces of the piston and manhole cover for engagement therewith to absorb and dissipate impact forces between the pisotn and manhole cover when the piston is returned to its position adjacent the lower end of the housing.

2. The improvement according to claim 1, in which:
the adjacent axial surfaces of the piston and manhole cover are of unequal area.

3. The improvement according to claim 2, in which:
the resilient cushioning means includes upper and lower surface areas, each of which are at least as large as the smaller of the adjacent axial surfaces of said piston and manhole cover.

4. The improvement according to claim 1, in which:
said resilient cushioning means is fabricated from a substance having the resilience and cushioning characteristics of medium-hardness rubber.

5. The improvement according to claim 8, in which:
the means securing said resilient cushioning means relative to one of said adjacent surfaces is so arranged that the entire impact imparted to the manhole cover by the piston is transmitted solely through and by said resilient means.

6. The improvement according to claim 8, in which:
the means securing said resilient cushioning means to one of said adjacent surfaces includes:
elongate fastening members, one end of each of which are removably associated with that member to which the resilient cushioning means is secured, and the other end of each of which is disposed within and at a location spaced from the other surface of said cushioning means, whereby all impact forces between the adjacent axial surfaces of the piston and manhole cover are transmitted solely through said cushioning member to the exclusion of said fastening means.

7. The improvment according to claim 1, in which:
said resilient cushioning means is fabricated from medium-hardness rubber of a durometer range between 40 and 70.

8. The improvement according to claim 1 in which:
means are provided securing said resilient cushioning means relative to one of said adjacent surfaces.

9. In a sausage stuffer of the type which includes a vertically disposed cylindrical housing having a manhole cover spanning and closing its lower end and having a piston movable therein from adjacent the lower end of the housing to adjacent the upper end of the housing, means for returning the piston from its position adjacent the upper end of the housing to its position adjacent the lower end of the housing and wherein said piston and manhole cover each have a flat, parallel, axial, adjacent surface, the improvement comprising:
resilient cushioning means interposed between the adjacent axial surfaces of the piston and manhole cover for engagement therebetween to absorb and dissipate impact forces between the piston and manhole cover when the piston is returned to its position adjacent the lower end of the housing.

References Cited

UNITED STATES PATENTS 2,238,182   4/1941   Napier _____ 17—39

FOREIGN PATENTS 811,200   8/1951   Germany _____ 17—39

LUCIE H. LAUDENSLAGER, Primary Examiner